15] Date of Patent: Jun. 9, 1998

United States Patent [19]
Bauck

[11] Patent Number: 5,764,017

| | | | |
|---|---|---|---|
| 5,329,454 | 7/1994 | Takeda et al. | 364/426.04 |
| 5,381,281 | 1/1995 | Shrinkle et al. | 360/77.08 |
| 5,384,526 | 1/1995 | Bennett | 318/610 |
| 5,384,671 | 1/1995 | Fisher | 360/51 |
| 5,420,730 | 5/1995 | Moon et al. | 360/77.08 |
| 5,444,582 | 8/1995 | Suzuki | 360/78.09 |
| 5,469,357 | 11/1995 | Nishimoto | 364/424.05 |

[54] SERVO LOOP COMPENSATION TECHNIQUE EXHIBITING IMPROVED BANDWITH

[75] Inventor: Randall C. Bauck, Boulder, Colo.

[73] Assignee: Iomega Corporation, Roy, Utah

[21] Appl. No.: 632,889

[22] Filed: Apr. 16, 1996

[51] Int. Cl.$^6$ ............................................. H02P 7/00
[52] U.S. Cl. ................................... 318/610; 364/162
[58] Field of Search ................................ 312/610, 609, 312/600, 625, 632, 432; 364/474.01, 474.12, 474.15, 474.3, 160–163

*Primary Examiner*—Jonathan Wysocki
*Attorney, Agent, or Firm*—Woodcock Washburn Kurtz Mackiewicz & Norris LLP

[57] ABSTRACT

A servo control system is presented that provides improved bandwidth. The improved bandwidth is achieved by dividing the differential portion of the servo control system into two components. One of the differential components experiences no delay thus improving the servo control system response. The differential component that experiences no delay is combined with the proportional portion of the control system and implemented as an analog circuit. The hybrid analog/digital loop compensation circuit provides even better response time as the analog circuit provides near instantaneous responses to changes in input.

[56] References Cited

U.S. PATENT DOCUMENTS

| | | | |
|---|---|---|---|
| 3,834,617 | 9/1974 | Dyntar | 236/78 X |
| 4,415,939 | 11/1983 | Ballard | 360/75 |
| 5,122,718 | 6/1992 | Sawata | 318/621 |
| 5,184,292 | 2/1993 | Scheider | 364/162 |
| 5,202,821 | 4/1993 | Bauck et al. | 364/162 |
| 5,301,072 | 4/1994 | Wilson | 360/77.01 |

22 Claims, 11 Drawing Sheets

SERVO LOOP COMPENSATION TECHNIQUE EXHIBITING IMPROVED BANDWITH

FIELD OF THE INVENTION

The present invention relates generally to servo loop compensation techniques, and more particularly to a servo loop compensation technique that exhibits improved bandwidth and is especially useful in a disk drive.

BACKGROUND OF THE INVENTION

The presently preferred embodiments of the invention relate to a servo loop compensation method and circuit especially useful in track following in a disk drive, and so the background of the invention will be discussed with reference to a disk drive. However, it should be noted that, except where they are expressly so limited, the claims at the end of this specification are not limited to applications involving disk drives.

A continuous closed loop control system may be configured as shown in FIG. 1. In this example, a summing device 11 and controller circuit 100 are utilized to control a physical plant or process, which in this case is a magnetic recording system 15. In the system depicted in FIG. 1, the controlled variable Y(t) is compared to a reference input X(t). The reference input X(t) may be an electrical signal corresponding to a particular track on a disk, and the controlled signal may be a signal indicating the present position of a transducer with respect to the particular track or some other reference. The comparison between the reference input and the controlled variable occurs at the summing device 11, which could be a differential amplifier, multiplier, or some other signal processing circuit. The output of summing device 11 is an error signal E(t) that corresponds to the difference between the input X(t) and the output Y(t). This error signal is provided as an input to the controller 100.

Controller 100 is a dynamic system added to the loop to stabilize and enhance the closed-loop system characteristics. The output of controller 100 is an actuating signal A(t), which changes as a function of the error signal E(t). The actuating signal A(t) is developed to correct the recording system 15, e.g., to control the position of a read/write (R/W) head over a desired track. The controller circuit 100 contains the control strategy for the entire servo control system. Within the control circuit 100 is a compensation component (s). Typical compensation strategies utilize proportional, integral, and differential compensation techniques. The selection of the compensation components will greatly effect the response of the system.

A typical goal of a controller is to position a read/write head over a given disk track as quickly as possible and to hold a transducer over the track as accurately as possible. The position of the read/write transducer is controlled by the servomechanism in accordance with signals from the read/write electronics of the system.

Such control systems have been implemented as digital and analog systems. U.S. Pat. No. 5,202,821, Apr. 13, 1993, entitled "Sampled-Data Control System Exhibiting Reduced Phase Loss", discloses further background relating to analog and digital control systems.

A primary goal of the present invention is to provide a track following servo-loop compensation technique with better loop bandwidth than that provided by conventional digital compensators. Improved bandwidth results in either (1) more accurate track following for a given number of servo samples on the disk, or (2) the same performance with fewer servo samples, thereby permitting more of the disk surface to be used for data storage.

SUMMARY OF THE INVENTION

A servo controller is presented to generate an actuator output signal, A(t), as a function of an input signal, E(t), which is especially useful to control the read/write heads in a disk drive system. The servo controller of this invention has a proportional, an integral and a differential compensator portion. The proportional component produces a proportional output signal proportional to the input signal. The integral component produces an integral output signal as an integration of the input signal. The differential component produces a differential output signal as a differential of the input signal. Furthermore, the differential output signal is comprised of a first gain term summed with a second differential component having a second gain term in series with a constant delay. The actuator output signal is produced by a summation of the proportional output signal, the integral output signal and the derivative output signal.

In a presently preferred embodiment of this invention, the first and second gain terms are constants $K_d$ and $-K_d$, respectively. Moreover, the differential component is a digital differentiator having a signal represented in the s-domain by the equation:

$$K_d(1-e^{-st_d})$$

where $t_d$ is a constant delay time.

According to a presently preferred embodiment, the entire compensator is implemented in a digital circuit. In another preferred embodiment of the present invention, the compensator is implemented as a combined digital and analog circuit. In the combined digital and analog embodiment, the analog circuit comprises a gain term. The analog gain term comprises the proportional output signal and the differentiator gain term.

In a disk drive system, the present invention meets predetermined performance and reliability requirements using fewer, e.g., 60, servo samples per revolution on the disk. In contrast, a conventional digital controller would require 90 servo samples per disk revolution to achieve the same performance. Other features of the present invention are disclosed below.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which:

FIG. 4A illustrates the magnitude response, and FIG. 4B illustrates the phase response;

DETAILED DESCRIPTION OF PREFERRED EMBODIMENTS

A servo-loop controller according to the presently preferred embodiments will now be described with reference to the FIGURES. It will be appreciated by those of ordinary skill in the art that the description given herein with respect to those FIGURES is for exemplary purposes only and is not intended in any way to limit the scope of the invention. For example, the time periods used in data sampling are merely those which are presently preferred and are not intended to limit the invention. Moreover, example applications are used throughout the description wherein the present invention is employed in conjunction with a disk drive system. That disk drive system application is not intended to limit the invention, as the invention is equally applicable to other physical systems.

Figure 1:
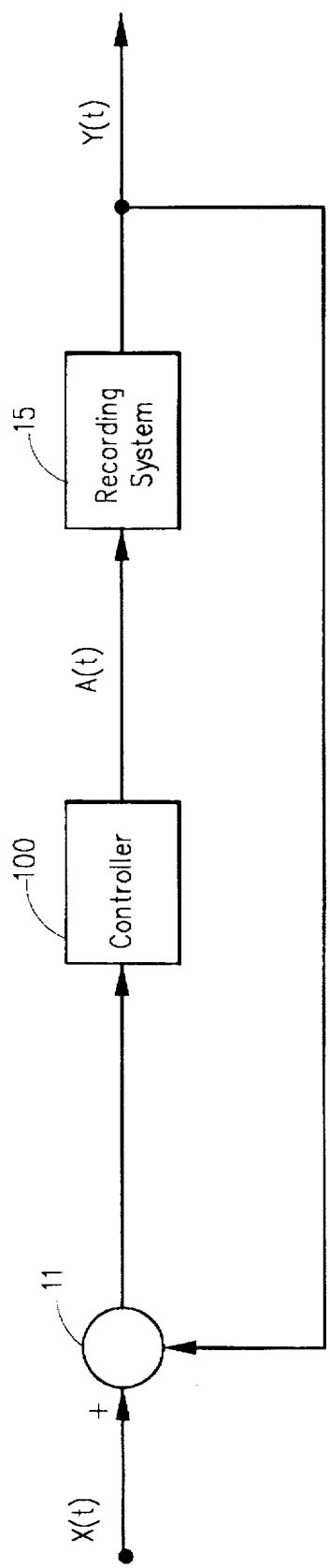
FIG. 1 is a block diagram of a conventional servo system.
Figure 1A:
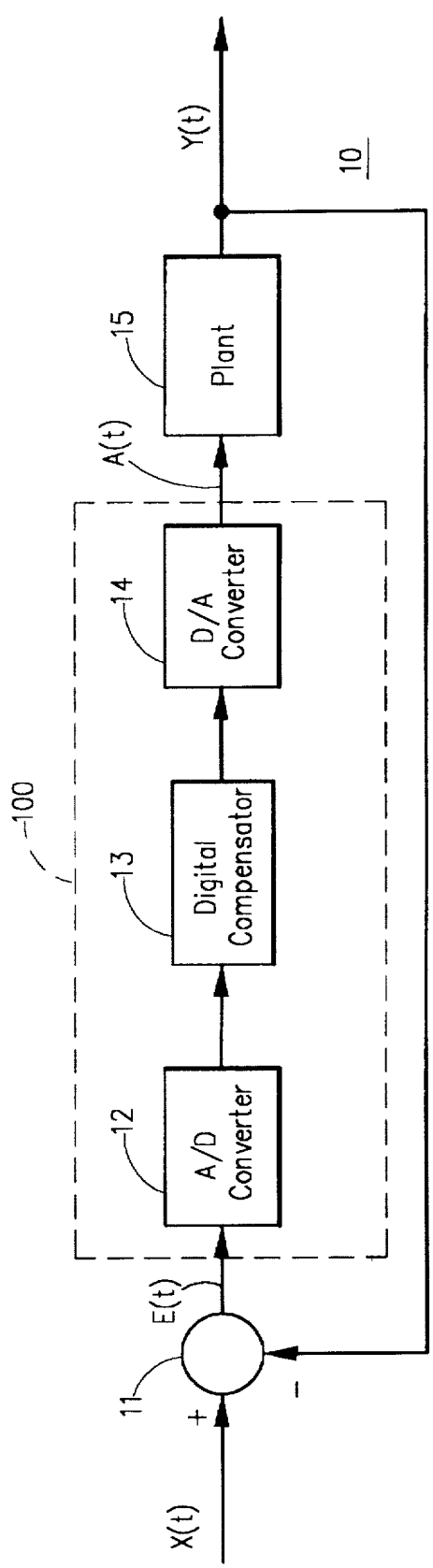
FIG. 1A is a block diagram of a prior art typical digital sampled-data control system employing an analog-to-digital converter as a sampling device and a digital-to-analog converter as a hold device.

FIG. 1A is a block diagram of a conventional control system 10 wherein the controller 100 is implemented as a digital sampled-data system. Plant 15 is the physical system or process to be controlled. In one embodiment, for example, plant 15 might comprise a magnetic recording system, such as a disk drive system, in which the position of the transducer over the magnetic recording media is controlled by a servo mechanism that receives signals from the read/write electronics of the system. In such a case, the reference input, X(t), represents the position for the track to be read from the media, and the controlled signal, Y(t), represents the position of the transducer.

Sensing device 11 provides the comparison between the reference input, X(t), and the controlled signal, Y(t). The output of sensing device 11 is an error signal, E(t), which corresponds to the difference between the reference input, X(t), and the controlled signal, Y(t). This error signal is provided as an input to the analog-to-digital converter 12.

As will be described more fully below, the controller in FIG. 1A is comprised of three major components an analog-to-digital converter 12, a digital compensator 13 and a digital-to-analog converter 14.

Analog-to-digital converter 12 receives the signal from sensing device 11 and outputs a digital number proportional to the error signal. The analog-to-digital converter 11 performs this conversion process once every sample period, T. This digital number is provided as an input to the digital compensator 13.

The digital compensator 13 physically may be a microprocessor which executes a software algorithm. This digital compensator 13 contains the control strategy and is added to the system to enhance the closed loop system characteristics. This combination of microprocessor and associated digital algorithm processes the input digital number from the analog-to-digital converter 12 and generates digital numbers which are provided as input to the digital-to-analog converter 14.

The digital-to-analog converter 14 receives the digital numbers from the digital compensator 13 and converts them to an electrical output signal which is provided as input to the plant 15. The output signal is an actuating signal, A(t), which is developed for correction of the plant 15.

The plant 15 receives and responds to the actuating signal, A(t), resulting in a change in the controlled signal, Y(t). The resulting output, Y(t), from the plant 15 is fed back to the sensing device 11 to close the loop.

Figure 1B:
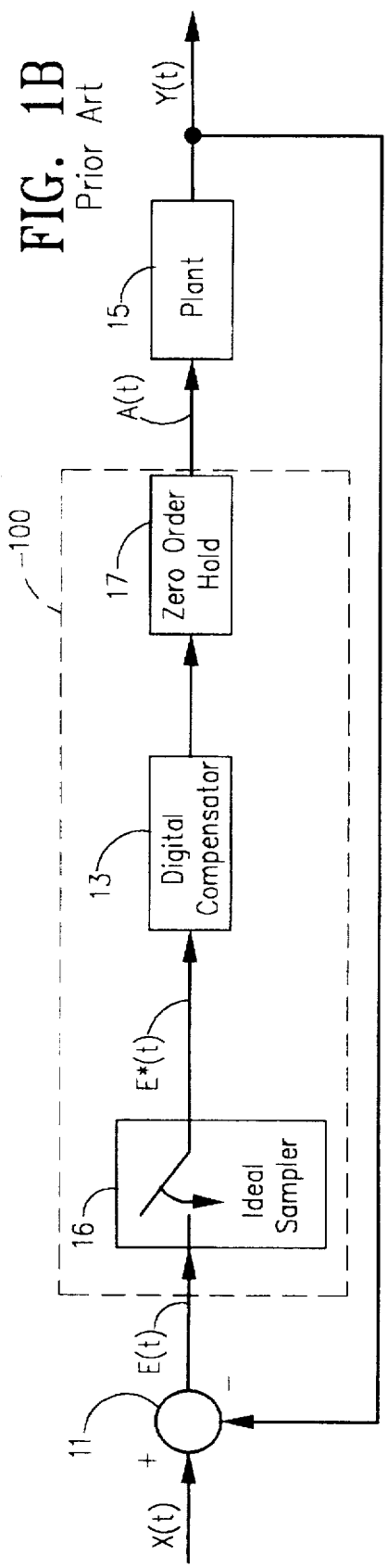
FIG. 1B is a block diagram of the digital sampled-data control system of FIG. 1A in which the function of the an analog-to-digital converter has been replaced by an ideal sampler. The digital-to-analog converter has been replaced by an ideal zero-order-hold.

FIG. 1B is a block diagram that illustrates how the physical system of FIG. 1A can be represented in order to mathematically model the control system. The analog-to-digital converter is replaced by an ideal sampler 16, and the digital-to-analog converter is replaced by an ideal zero-order-hold 17.

Figure 1C:
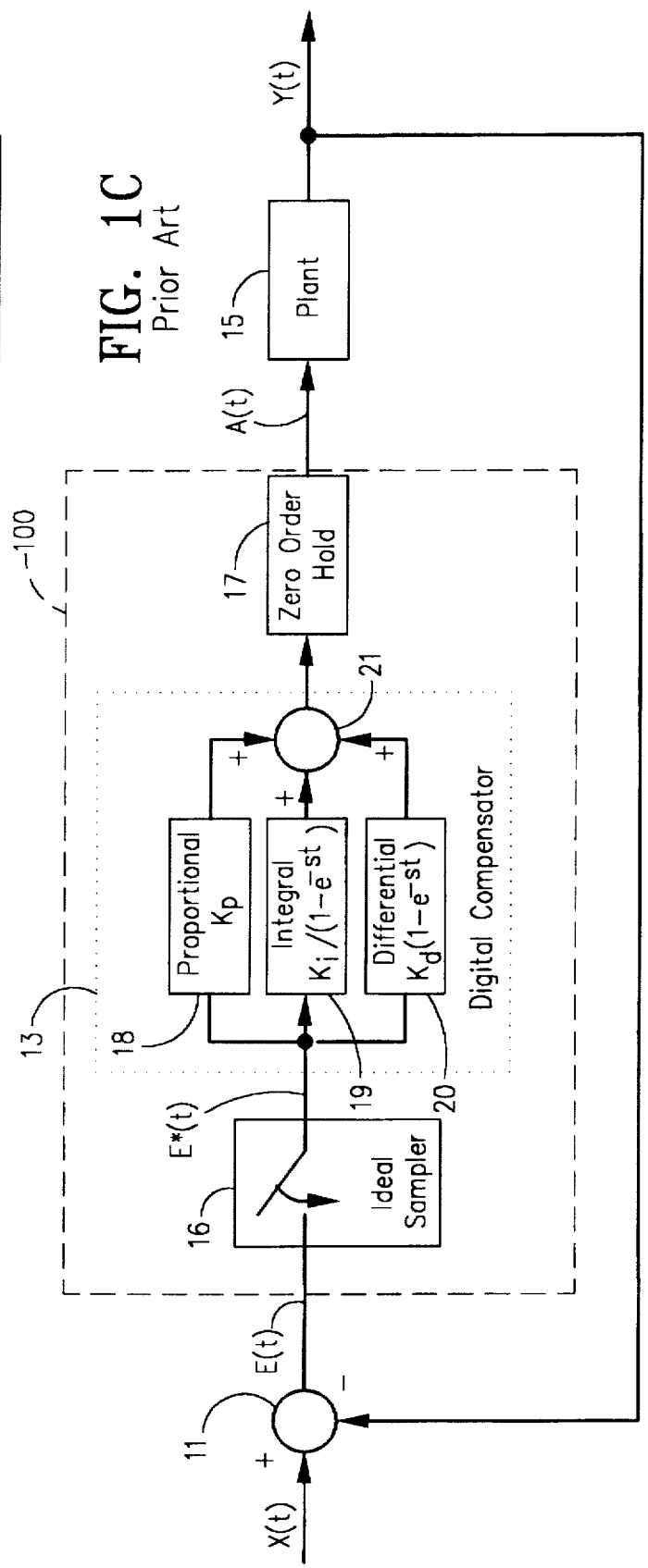
FIG. 1C is a block diagram of the digital sampled-data control system of FIG. 1B in which the function of the digital compensator has been illustrated as the sum of a proportional term, integral term, and differential term.

FIG. 1C is a block diagram which represents the digital compensator 13 as a sum of a proportional (P) 18, integral (I) 19, and differential (D) 20 blocks. This form of a control system is commonly referred to as a PID controller. The mathematical s-domain (Laplace) transfer functions (TF) of the proportional (P) 18, integral (I) 19, and differential (D) 20 blocks are given in equations (1)-(3), respectively, as follows:

$$TF_P(s) = K_p \tag{1}$$

$$TF_I(s) = K_i/(1-e^{sT}) \tag{2}$$

$$TF_d(S) = K_d(1-e^{sT}) \tag{3}$$

As shown in FIG. 1C, the outputs of each of the respective blocks are summed by device 21 and this number is provided as an input to the zero-order-hold 17.

Figure 1D:
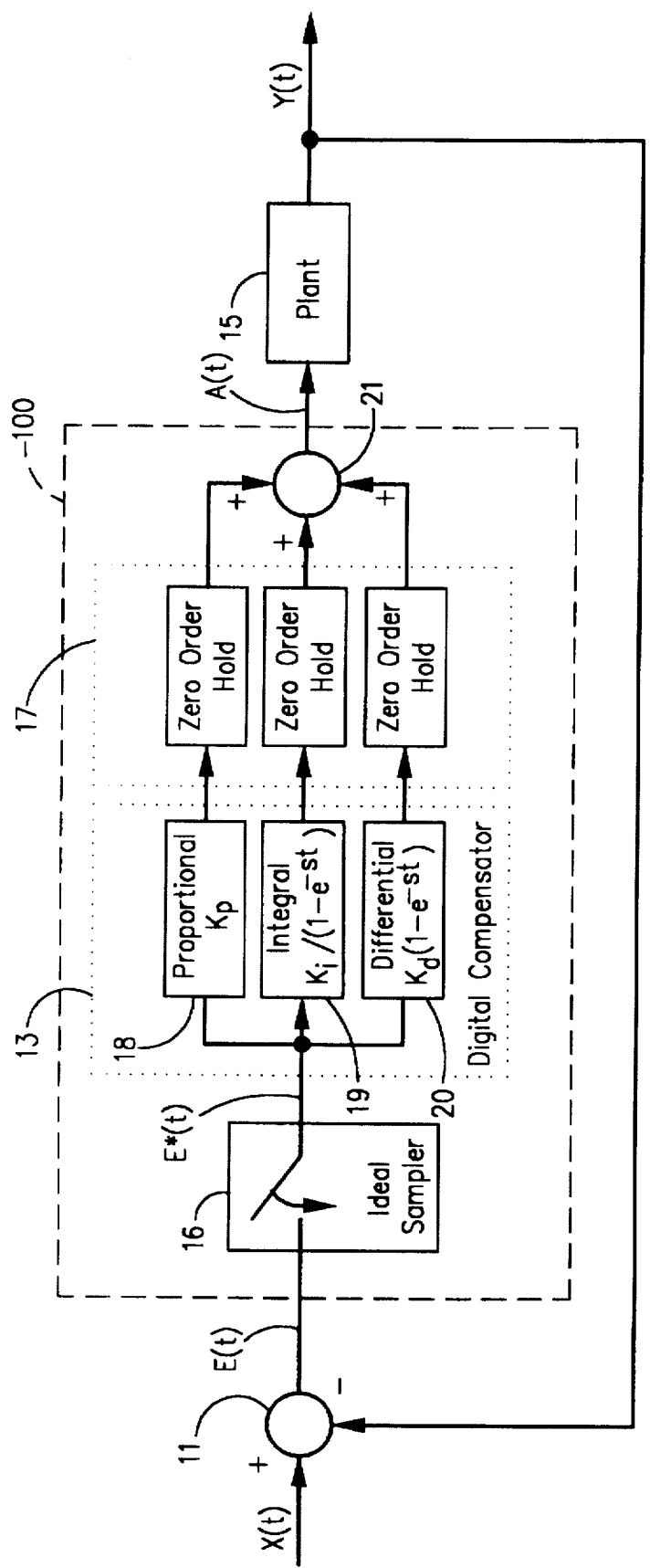
FIG. 1D is a block diagram of the combined digital and analog control system of a presently preferred embodiment of the present invention.

FIG. 1D is a block diagram of the digital control system of FIG. 1C in which the function of the zero-order-hold 17 has been depicted as three separate zero-order-holds associated with the proportional 18, integral 19 and differential 20 blocks. In this FIGURE, summing device 21 is depicted as adding the output of the zero-order-hold of each block. Importantly, such a system is mathematically equivalent to the system of FIG. 1C and has been depicted with separate zero-order-holds in order to more clearly describe the present invention.

Figure 2A:
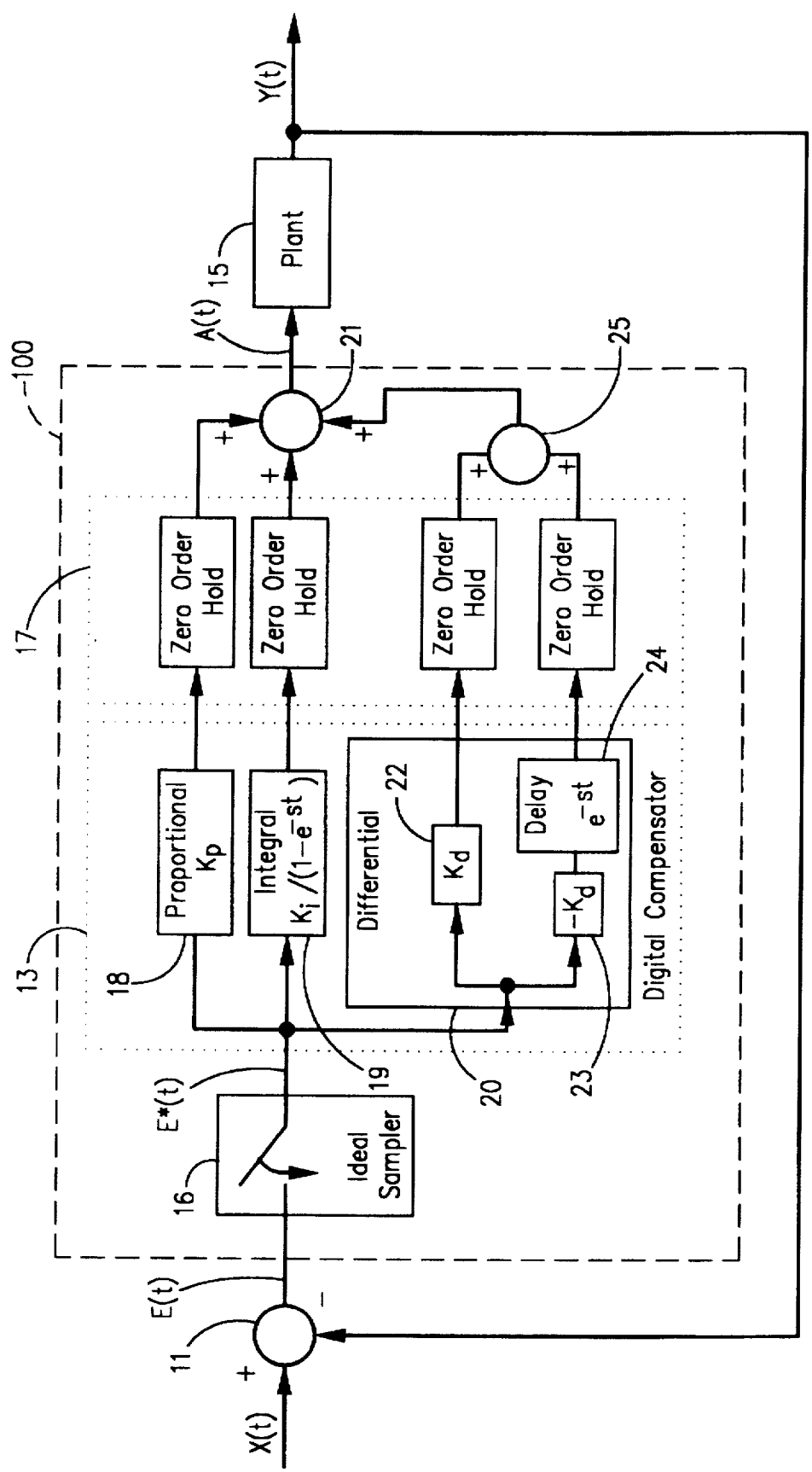
FIG. 2A is a block diagram of the digital sampled-data control system that embodies aspects of the present invention.

An aspect of the present invention involves implementing the digital differentiator 20 part of the compensator 13 in a manner that reduces the phase loss of the controller 100 as compared with conventional controllers. Accordingly, the digital algorithm used to implement the digital differentiator 20 simulates the time domain sum of: 1) the sampled and held error signal and 2); the delayed and inverted sampled and held error signal. FIG. 2A is a block diagram in which the digital differentiator block 20 has been modified to represent the present invention. As can be seen, the new digital differentiator 20 is illustrated as the parallel combination of: 1) a constant gain block 22 and: 2) a constant gain block 23 in series with a constant delay block 24. Summing device 25 adds the result of the parallel paths. As will be described more fully below, the features of the present invention will become more apparent by tracing an exemplary error signal through the differentiator 20.

Figure 3A:
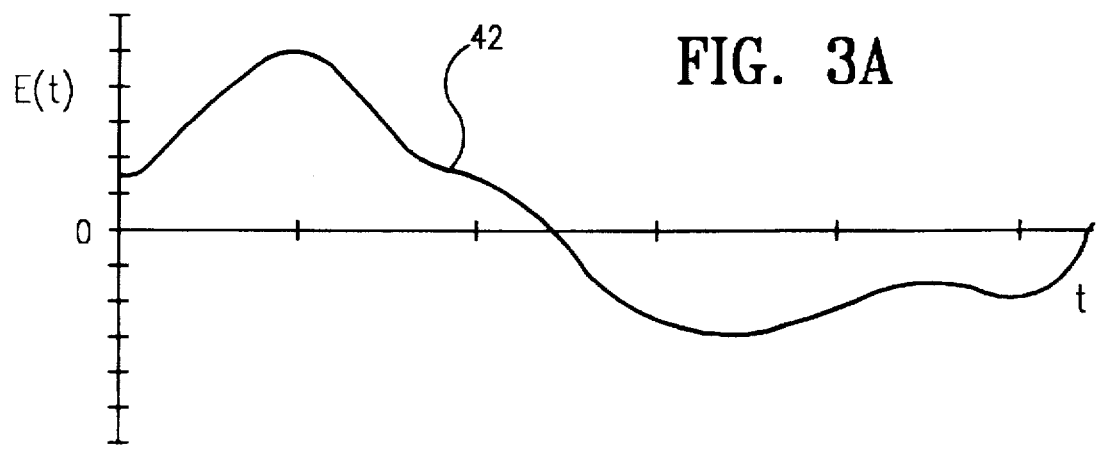
FIG. 3A is an example of an error signal which may be applied to the control system of the present invention.

FIG. 3A is an example of an analog error signal, E(t) 42, which may be applied to the controller 100 of the present invention. This signal represents the continuous difference between the reference signal, X(t), and the controlled signal, Y(t), i.e., the output from sensing device 11. When analog signal 42 is applied to the input of ideal sampler 16, the output of the sampler 16 is a train of impulses, each occurring at an integral multiple of the sampling period, T. This output, E*(t), is shown in FIG. 3B, wherein the impulses are represented by arrows 43.

Figure 3B:
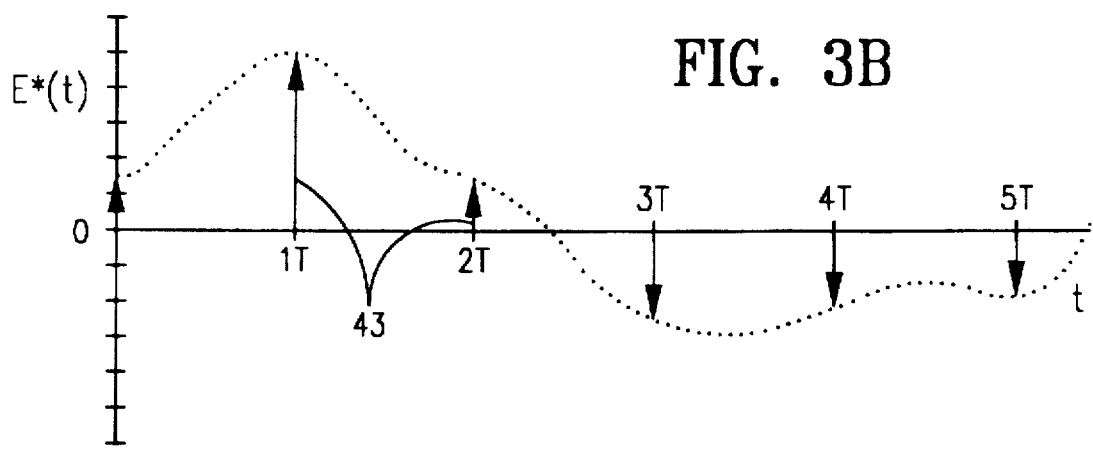
FIG. 3B illustrates the output impulses produced by an ideal sampler in response to the error signal of FIG. 3A.
Figure 3C:
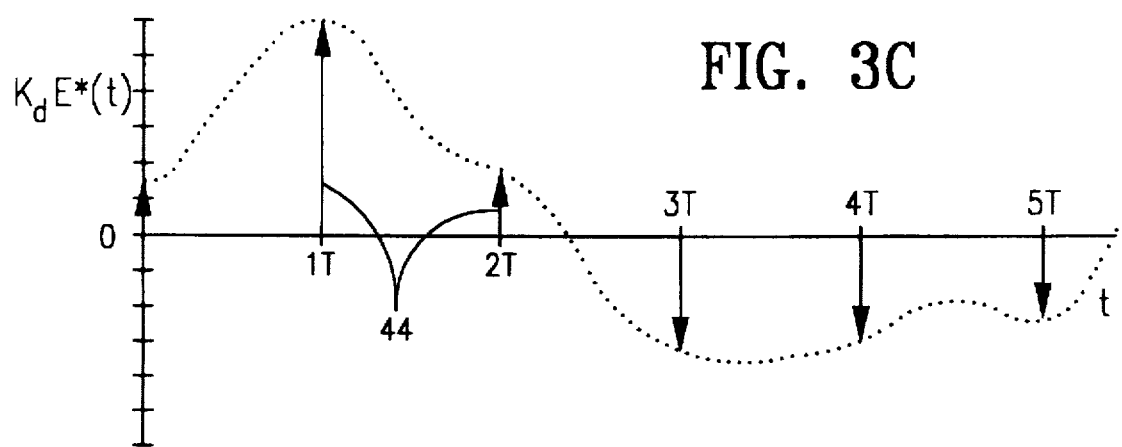
FIG. 3C illustrates the output signal of a constant gain ($K_d$) block in response to the signal of FIG. 3B.
Figure 3D:
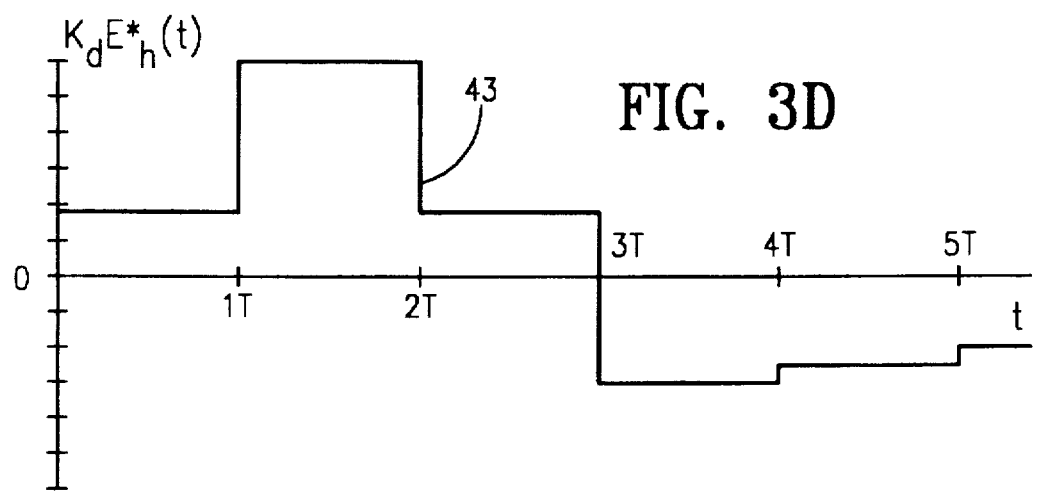
FIG. 3D illustrates the output signal produced by a zero-order-hold in response to the impulse train of FIG. 3B.

FIG. 3C illustrates the output signal, $K_d E^*(t)$ 44, which is the pulse train 43 of FIG. 3B multiplied by constant gain block 22, $K_d$. FIG. 3D shows the output signal after the zero-order-hold associated with constant gain block 22. This signal 45 can be represented mathematically as $K_d E^*_h(t)$, and illustrates the operation of the constant gain block 22, with its associated zero-order-hold, of the present invention as shown in FIG. 2A.

Figure 3E:
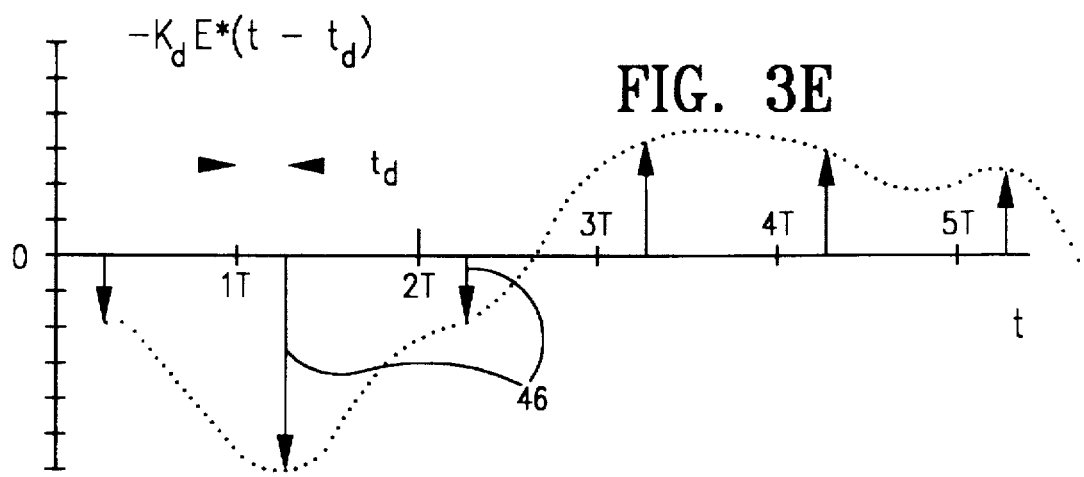
FIG. 3E illustrates the output signal of the series combination of a constant gain ($-K_d$) block and a pure time delay ($t_d$) block in response to the signal of FIG. 3B.

FIG. 3E graphically depicts the operation of the constant gain block 23 in a series with a constant delay block 24. The resulting signal 46 represents the signal of FIG. 3D inverted and delayed by a constant time, $t_d$. This signal 46 can be represented mathematically as $-K_d E^*(t-t_d)$.

Figure 3F:
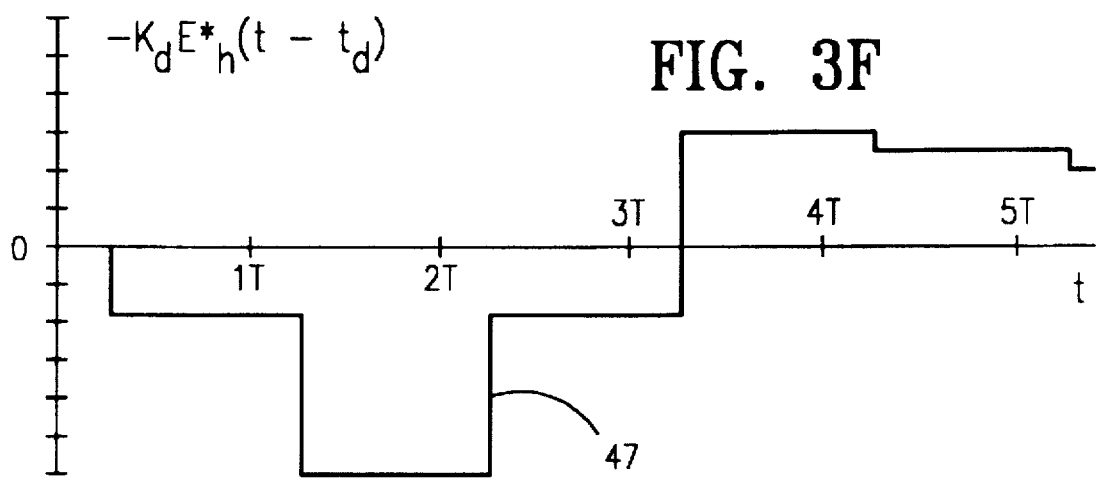
FIG. 3F illustrates the output signal produced by a zero-order-hold in response to the impulse train of FIG. 3E.

FIG. 3F graphically depicts the operation of the output signal of FIG. 3E after experiencing the effect of the sample-and-hold associated with constant delay block 24. The resulting signal 47 can be represented mathematically as $-K_d E^*_h(t-t_d)$.

Figure 3G:
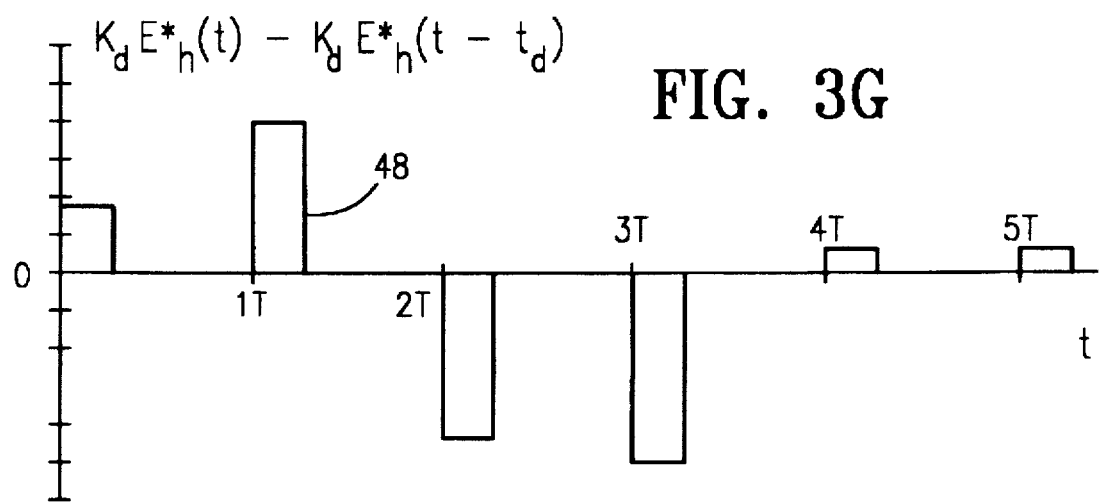
FIG. 3G illustrates the sum of the signals of FIGS. 3D and 3F.

FIG. 3G graphically depicts the operation of the summing device 25 in FIG. 2A. The summing device 25 combines the output of the zero-order-hold associated with the constant gain block 22 with the output of the zero-order-hold associated with constant delay block 24. The resulting sum of signals 45 and 47 can be represented mathematically as $K_d E^*_h(t) - K_d E^*_h(t-t_d)$ and is graphically depicted as signal 48 in FIG. 3G.

The transfer function of this digital differentiator can be expressed in the s-domain (Laplace) as:

$$Tf_d(S) = K_d(1-e^{-st_d}) \quad (4)$$

Note that this is the transfer function of the output of this digital differentiator divided by the signal $E^*_h(t)$. This transfer function does not include the effect of the zero-order-holds. This was done so that a direct comparison of the transfer function of a conventional digital differentiator (given by equation (3)) with the transfer function of the digital differentiator of the present invention (given by equation (4)) can be clearly shown.

Figure 4A:
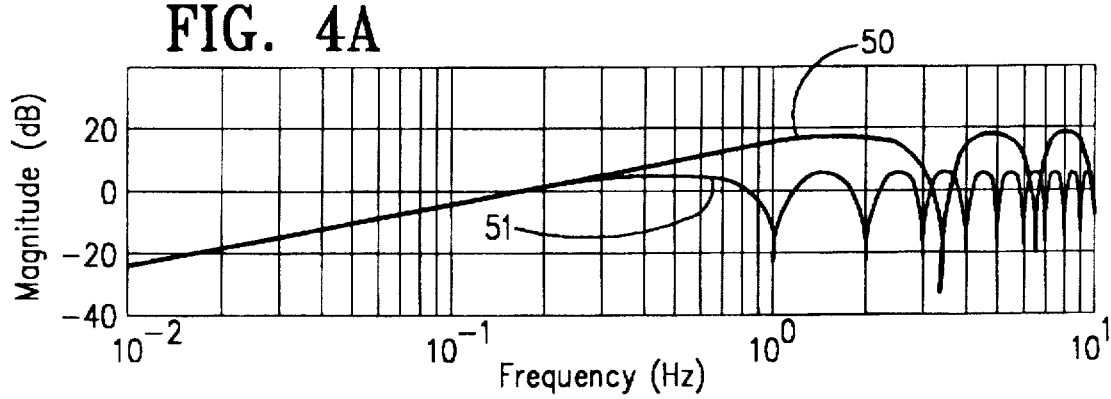
FIGS. 4A and 4B show the Bode plot comparing the conventional digital versus the digital differentiator employed within the control system of the present invention.
Figure 4B:
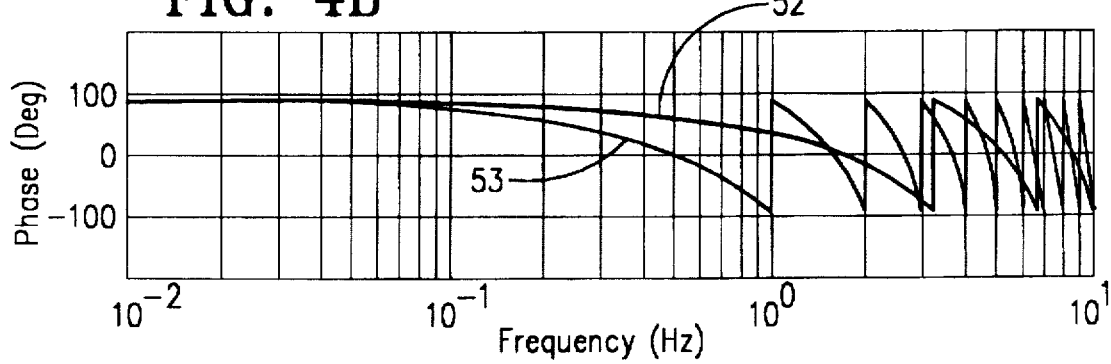

FIGS. 4A and 4B are Bode plots comparing the characteristics of the conventional digital differentiator (given by equation (3)) with the characteristics of the digital differentiator of the present invention (given by equation (4)). FIG. 4A is a plot of the magnitude response of the two differentiators. The magnitude response of the differentiator of the present invention is shown by curve 50. The magnitude response of the conventional digital differentiator is shown by curve 51. FIG. 4B is a plot of the phase response of the two differentiators. The phase response of the differentiator of the present invention 52 shows a significantly reduced amount of phase loss compared to the phase response of the conventional digital differentiator 53. For illustrative purposes, a time delay, $t_d$, of 0.3T was used to generate these Bode plots.

As stated above, this delay time is typically limited to a minimum by the characteristics of the specific physical hardware (speed of the analog-to-digital converter, microprocessor, and digital-to-analog converter) used to implement the control system. The presently preferred digital embodiment can be implemented in a digital circuit as depicted in FIG. 1A wherein the digital compensator 13 is implemented using a microprocessor, and the compensator functions are implemented using a software program. Those skilled in the art should appreciate that a software program includes variations, such as a firmware implementation.

Figure 5A:
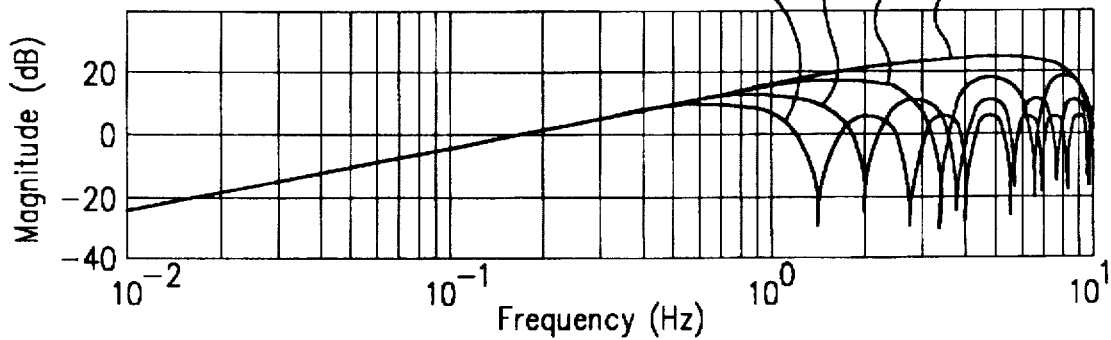
FIGS. 5A and 5B show the Bode plot of the digital differentiator of the present invention for various time delays; and, FIG. 6 is a schematic of a preferred embodiment of the combined analog and digital embodiment of the present invention.
Figure 5B:
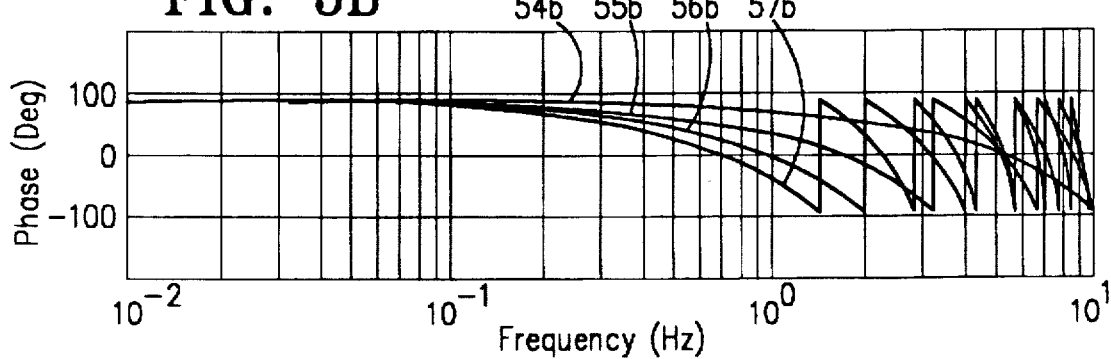

FIGS. 5A and 5B are Bode plots illustrating the response of the digital differentiator of this invention (given by equation (4)) for various values of delay time, $t_d$. Curves 54a–57a of FIG. 5A illustrate the magnitude, while curves 54b–57b of FIG. 5B illustrate the phase characteristics of the digital differentiator of this invention with a delay time, $t_d$, of 0.1T, 0.3T, 0.5T, and 0.7T, respectively. Significantly, the response time of the system improves as the delay time decreases. Therefore, the response time of the system will be limited by the speed of the microprocessor in calculating the differential portion of the control system.

Figure 2B:
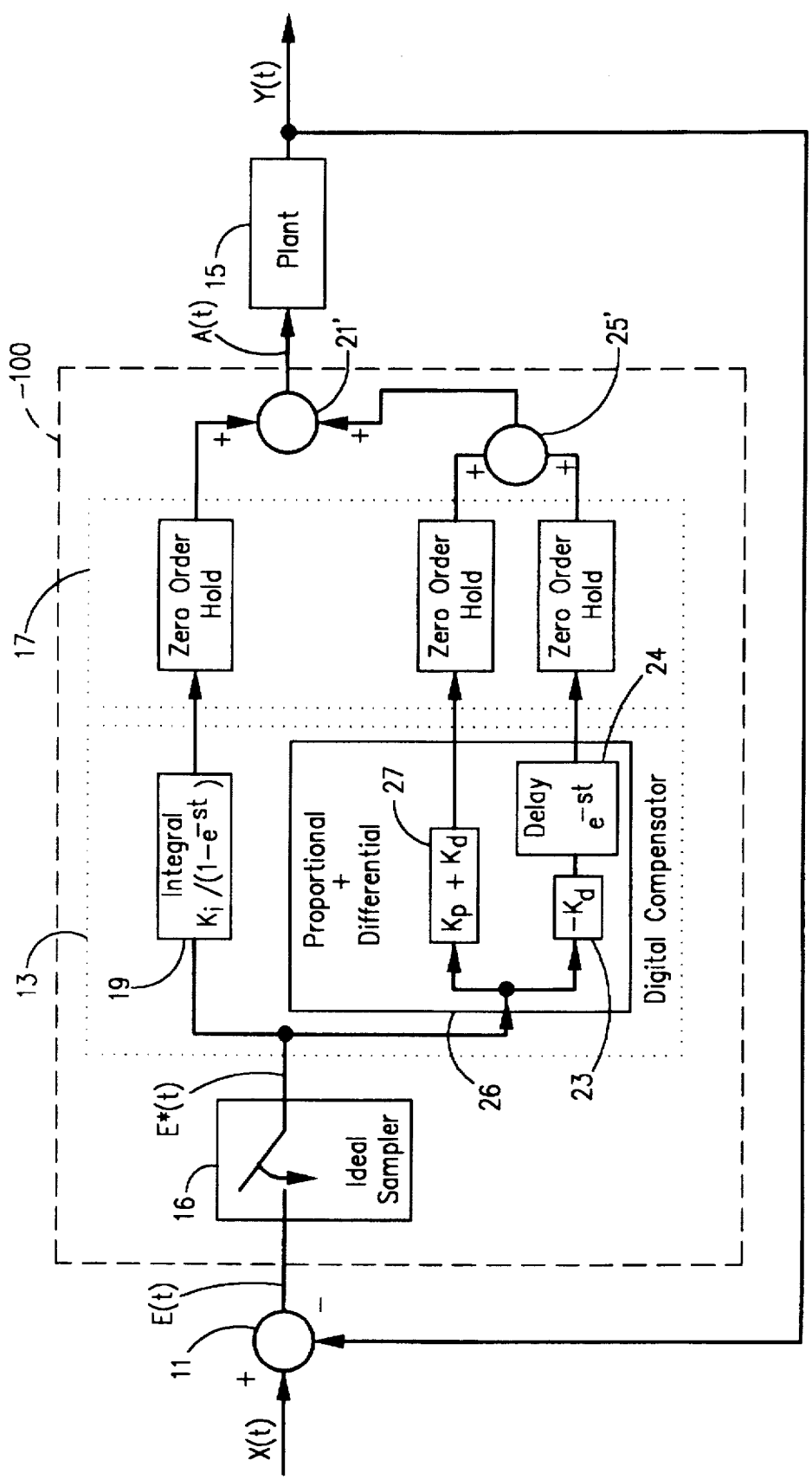
FIG. 2B is a block diagram of the digital sampled-data control system of FIG. 2A in which the function of the proportional and integral blocks have been combined.
Figure 2C:
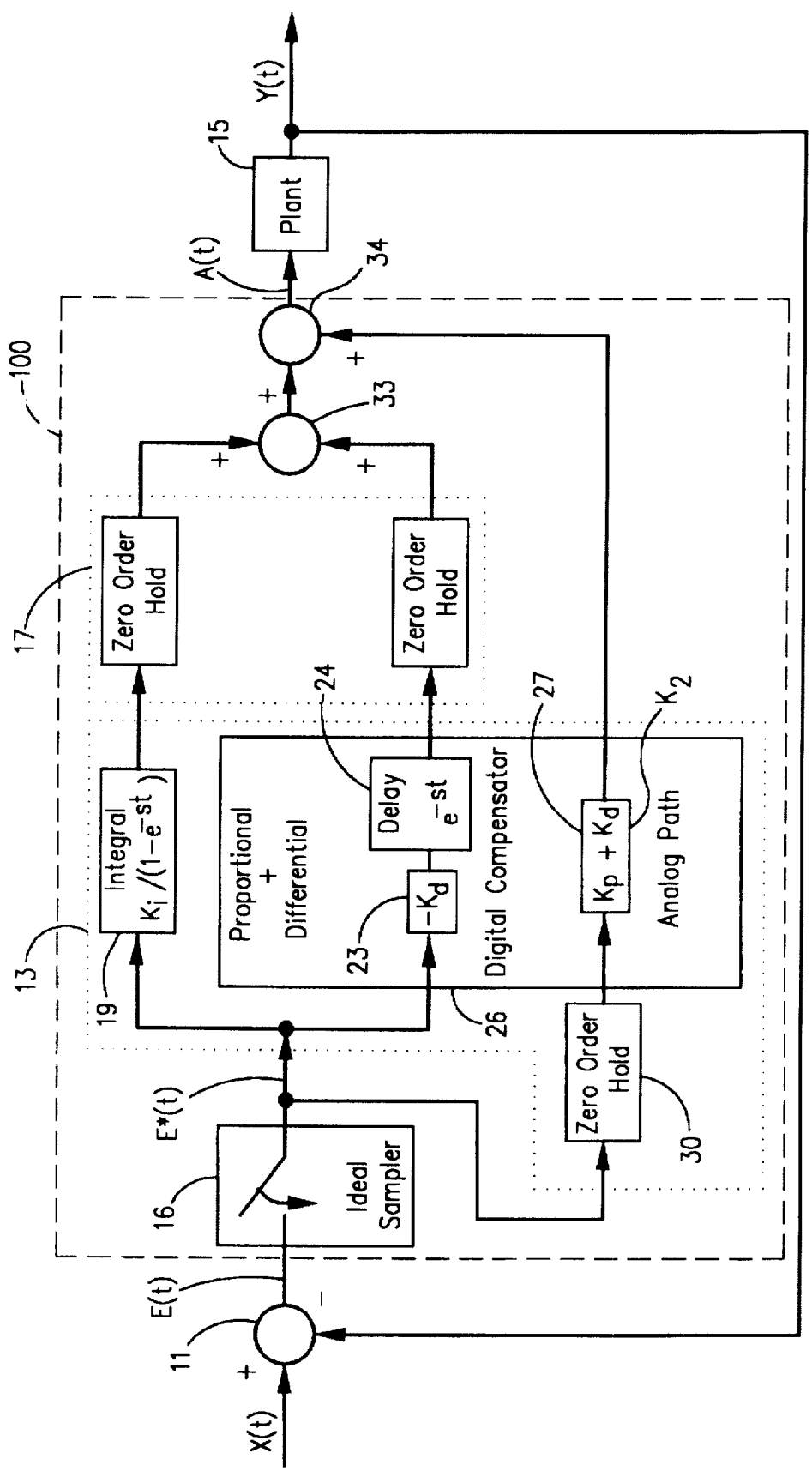
FIG. 2C is a block diagram of a combined analog and digital control system which illustrates an alternative embodiment of the present invention where a constant gain analog path replaces the constant gain digital path of FIG. 2B.

An alternative embodiment of the present invention is represented by the block diagram of FIG. 2C. In the FIGURE, the compensator circuit 13 is comprised of an analog and a digital portion. FIG. 2B illustrates how the proportional and differential components of FIG. 2A can be combined in block 26 such that the constant values of the differential control and the proportional control can be separated from the other portion of the compensator. Significantly, the constant gain path, $K_d$, of the differentiator 22 and the proportional constant gain path 18 represented by $K_p$ are combined in block 27 of FIG. 2B. Thus, as shown, the constant portion of the differentiator function is combined with the proportional constant. Now, since the block 27 is a constant gain block, it can be realized by an analog amplifier with a constant gain. FIG. 2C illustrates the final combined analog and digital embodiment. The constant gain analog block 27 functions equivalently to the constant gain block 27 in FIG. 2B. This analog embodiment has the advantage of reducing the amount of calculation required in the digital algorithm and results in a small reduction in the overall phase loss of the system. The small reduction in phase loss is proportional to the calculation time saved in the digital compensator as a result of not having to do the calculations represented by the constant digital gain block 27. The amount of time saved is a function of the specific hardware used to implement the digital algorithm.

Figure 6:
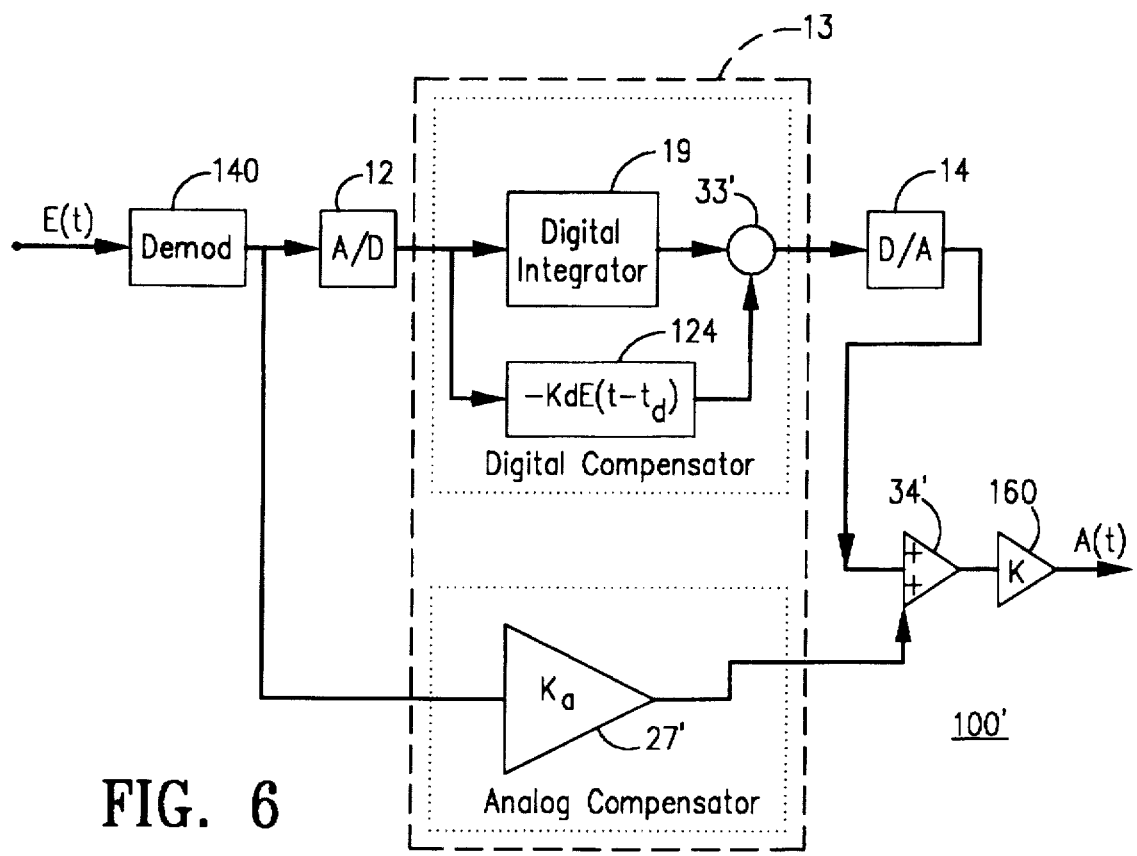

FIG. 6 is a more detailed block diagram of a servo loop compensation circuit 100' in accordance with the combined digital and analog embodiment of the present invention. In this embodiment, the digital portion of the controller 100 comprises an A/D convertor 12, a digital integrator 19, a digital differential portion 124 that combines gain term 23 and constant delay 24, a summing term 33' and a D/A convertor 14. The analog portion includes a constant gain amplifier 27' providing a fixed gain of $K_a$, which is equivalent to $K_d + K_p$. In addition, the servo loop controller circuit 100' includes another summing circuit (operational amplifier) 34', and a power amplifier 160. The function of the block 124 is to implement the remaining portion of the differential algorithm ($-K_d E(t-t_d)$) in software or firmware in the microprocessor. The algorithm is as follows:

1. read digitized position error from A/D
2. multiply this number by $-K_d$
3. output result to D/A As noted above, the response time of combined digital and analog the system improves as the delay time decreases. Thus, the faster this algorithm is performed the better the system bandwidth.

Figure 7:
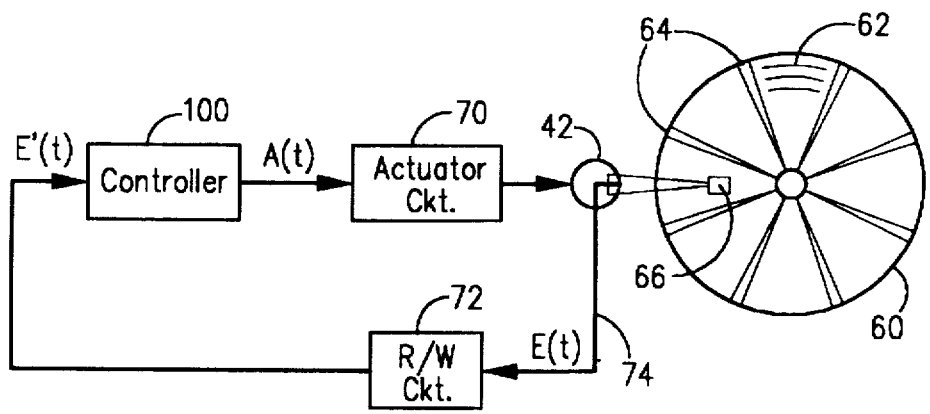
FIG. 7 is a schematic diagram of the compensator circuit of the present invention employed in a disk drive servo loop.

FIG. 7 schematically depicts how the digital or the combined digital and analog compensator of the present invention can be employed in controller 100 used in connection with a recording system. A disk 60 comprising a plurality of prerecorded tracks 62 and sector servo signals 64 is read from or written to by a R/W head 66. The R/W head 66 is positioned by a servo motor 42 driven by an actuator circuit 70. A R/W circuit 72 communicates with the R/W head 66 via line 74.

The primary function of the system of FIG. 7 is to accurately follow a particular track 62 on disk 60. The circuit of FIG. 7 is best understood with additional reference to the servo models depicted in FIGS. 2A and 2C. The path of a track 62 on disk 60 in FIG. 7 represent the signal X(t) depicted in FIGS. 2A and 2C. The absolute position of the R/W head 66 represents the signal Y(t). In the instance of a perfectly circular track, the R/W head 66 could simply find the track centerline and remain fixed at that position. However, every track 62 deviates from a perfect circle and the head 66 must closely track those deviations. The difference between the position of R/W head 66 and the center of the track represents the error signal E(t). Thus the summing (shown as 11 in FIGS. 2A and 2C) and the generation of the error signal occurs within the mechanical components of the disk drive of FIG. 7 (i.e., the head in conjunction with the track). The output via line 74 represents the signal E(t).

In FIG. 7, the relative position of the head with respect to the track is determined via the servo signals 64. Essentially, each servo signal 64 consists of an amplitude signal from two fields, A and B. The strength of the A field indicates head drift inward on the disk 60 and away from the track 62. On the other hand, the strength of the B field indicates head drift outward on the disk 60 and away from the track 62. The relative amplitude of the A and B fields together represent the error signal E(t). However, this error signal is in a format unusable by the controller 100. Thus, the R/W circuit 72 modulates the signal E(t) to a signal E'(t), which is usable by the controller 100.

The controller circuit 100 receives the error signal E(t) and generates the actuating signal A(t) for use by the actuator circuit 70 to drive the head actuator 42 to position the R/W head 66 over the desired track. By employing the compensator circuit of the present invention, the servo-loop bandwidth is improved. Improved bandwidth results in either (1) more accurate track following for a given number of servo samples on the disk, or (2) the same performance with fewer servo samples, e.g., the number of servo samples can be reduced to 60 while maintaining the performance of the track following. As a result of the fewer servo samples, more of the disk surface can be used for data storage.

Those skilled in the art will readily appreciate that many modifications to the invention are possible within the scope of the invention. For example, the techniques described herein are not limited to controlling disk drive systems. Other types of sampled-data control systems may utilize the techniques described such as robotic control systems, aircraft control systems and the like. Accordingly, the scope of the invention is not intended to be limited by the preferred embodiment described above but only by the appended claims.

I claim:

1. A servo controller wherein an actuator output signal, A(t), is generated as a function of an input signal, E(t), said input signal being sampled at a sampling time period, T, comprising:

a proportional control component for producing a proportional output signal proportional to said input signal;

an integral control component for producing an integral output signal as an integration of said input signal;

a differential control component for producing a differential output signal as a differential of said input signal, wherein said differential control component is comprised of a first differential component comprised of a first gain term, a second differential component having a second gain term in series with a constant delay having a time delay less than said sampling time period, and a first summing component for summing said first differential component and said second differential component to produce said differential output signal; and, a second summing component that produces an actuator output signal as a summation of said proportional output signal, integral output signal and derivative output signal.

2. The servo controller as recited in claim 1, wherein said first gain term is a constant $K_d$ and said second gain term is a constant $-K_d$.

3. The servo controller as recited in claim 2, wherein said differential component comprises a signal represented in the s-domain by the equation:

$$K_d(1-e^{-st_d})$$

where $t_d$ is a constant delay time and $K_d$ is based on said first gain term and said second gain term.

4. The servo controller as recited in claim 3, wherein said differential component comprises a digital circuit.

5. The servo controller as recited in claim 1, wherein said proportional component comprises an analog circuit and wherein said first differential component comprises an analog circuit and said second differential component comprises a digital circuit.

6. A compensator for use in a servo control system to generate an analog output signal as a function of an input signal and a digital output as a function of a digital sample of the input signal, comprising:

a digital circuit comprising a first differentiator portion for applying a delay and a first gain to the digital sample of the input signal, whereby a digital output signal is provided; and, an analog circuit comprising means for providing a second gain to the input signal and providing an analog output signal.

7. The compensator as recited in claim 6, wherein said digital circuit further comprises an integrator which receives as an input the digital sample of the input signal, and a summing circuit for summing the respective outputs of said integrator and said first differentiator portion.

8. The compensator as recited in claim 6, wherein said first gain is a constant $-K_d$ and said second gain is a constant $K_a$.

9. The compensator as recited in claim 8, wherein said constant $K_a$ comprises a proportional constant and an inverse of said constant $-K_d$.

10. A digital compensator circuit for producing a digital compensator signal as a function of a digital input signal, said digital input signal having a period, T, comprising:

a proportional control circuit for producing a proportional output signal proportional to said input signal;

an integral control circuit for producing an integral output signal as an integration of said input signal;

a differential control circuit for producing a differential output signal as a differential of said input signal, wherein said differential control circuit comprises a first digital differential circuit having a first constant gain term, a second digital differential circuit having a second constant gain term in series with a constant delay having a time delay less than said digital input signal period, and a first summing component for summing said first digital differential circuit and said second digital differential circuit to produce said differential output signal; and, a second summing component for summing said proportional output signal, integral output signal and derivative output signal to produce the digital compensator output.

11. The digital compensator as recited in claim 10, wherein said first gain term is a constant $K_d$ and said second gain term is a constant $-K_d$.

12. The digital compensator as recited in claim 11, wherein said digital differentiator circuit comprises a signal represented in the s-domain by the equation:

$$K_d(1-e^{-st_d})$$

where $t_d$ is a constant delay time and $K_d$ is based on said first gain term and said second gain term.

13. A digital servo controller for generating an actuator output signal, A(t), as a function of an input signal, E(t), comprising:

means for generating a sampled input E*(t), based on the input signal, E(t), being sampled at a sampling time period, T;

a digital compensator circuit comprising:

a proportional control circuit for producing a proportional output signal proportional to said sampled signal;

an integral control circuit for producing an integral output signal as an integration of said sampled signal;

a differential control circuit for producing a differential output signal as a differential of said sampled signal, wherein said differential control circuit comprises a first digital differential circuit having a first constant gain term, a second digital differential circuit having a second constant gain term in series with a constant delay having a time delay less than said sampling time period T, and a first summing component for summing said first digital differential circuit and said second digital differential circuit to produce said differential output signal; and, a second summing component for summing said proportional output signal, integral output signal and derivative output signal to produce a digital compensator output signal; and, means for converting the digital compensator output signal to an analog output signal.

14. The digital servo controller as recited in claim 13, wherein said first gain term is a constant $K_d$ and said second gain term is a constant $-K_d$.

15. The digital servo controller as recited in claim 14, wherein said digital differentiator circuit comprises a signal represented in the s-domain by the equation:

$$K_d(1-e^{-st_d})$$

where $t_d$ is a constant delay time and $K_d$ is based on said first gain term and said second gain term.

16. The digital servo controller as recited in claim 13, wherein said means for generating a sampled signal comprises a digital-to-analog converter.

17. The digital servo controller as recited in claim 13, wherein said means for converting the digital compensator output signal to an analog output signal comprises a digital-to-analog converter.

18. The digital servo controller as recited in claim 13, wherein said digital compensator circuit comprises a software program executing on a processor.

19. A servo control method, comprising the steps of:

(a) sampling an input signal E(t) at a sampling time period, T, to produce a sampled signal E*(t);

(b) producing a proportional output signal proportional to said sampled signal;

(c) producing an integral output signal as an integration of said sampled signal;

(d) producing a differential output signal as a differential of said sampled signal, wherein said differential output signal comprises the further steps of summing a first differential gain term and a second differential gain term summed with a constant delay having a time delay less than said sampling time period T; and, (e) summing said proportional output signal, integral output signal and derivative output signal.

20. The servo control method as recited in claim 19, wherein said first differential gain term is a constant $K_d$ and said second differential gain term is a constant $-K_d$.

21. The servo control method as recited in claim 19, wherein said step (d) comprises a differential output signal represented in the s-domain by the equation:

$$K_d(1-e^{-st_d})$$

where $t_d$ is a constant delay time and $K_d$ is based on said first gain term and said second gain term.

22. A disk drive having a disk media whereby tracks on the disk media surface are indicated by servo samples, comprising:

a read/write head for reading the servo samples and producing an error signal as the position of the read/ write head read relative to a predefined signal, said error signal having a period, T;

a servo controller for providing an actuator signal as a function of the error signal, comprising:

a proportional control component for producing a proportional output signal proportional to said error signal;

an integral control component for producing an integral output signal as an integration of said error signal;

a differential control component for producing a differential output signal as a differential of said error signal, wherein said differential control component is comprised of a first differential component comprised of a first gain term, a second differential component having a second gain term in series with a constant delay having a time delay less than said period T, and a first summing component for summing said first differential component and said second differential component to produce said differential output signal; and, a second summing component that produces the actuator signal as a summation of said proportional output signal, integral output signal and derivative output signal; and, an actuator for providing a signal to move the read/write heads such that the error signal approaches zero.

* * * * *